Sept. 28, 1954 H. H. TURNER 2,690,352
PLURAL HOPPER SUCCESSIVELY TRIPPED DUMP TRAILER
Filed April 7, 1949 6 Sheets-Sheet 2
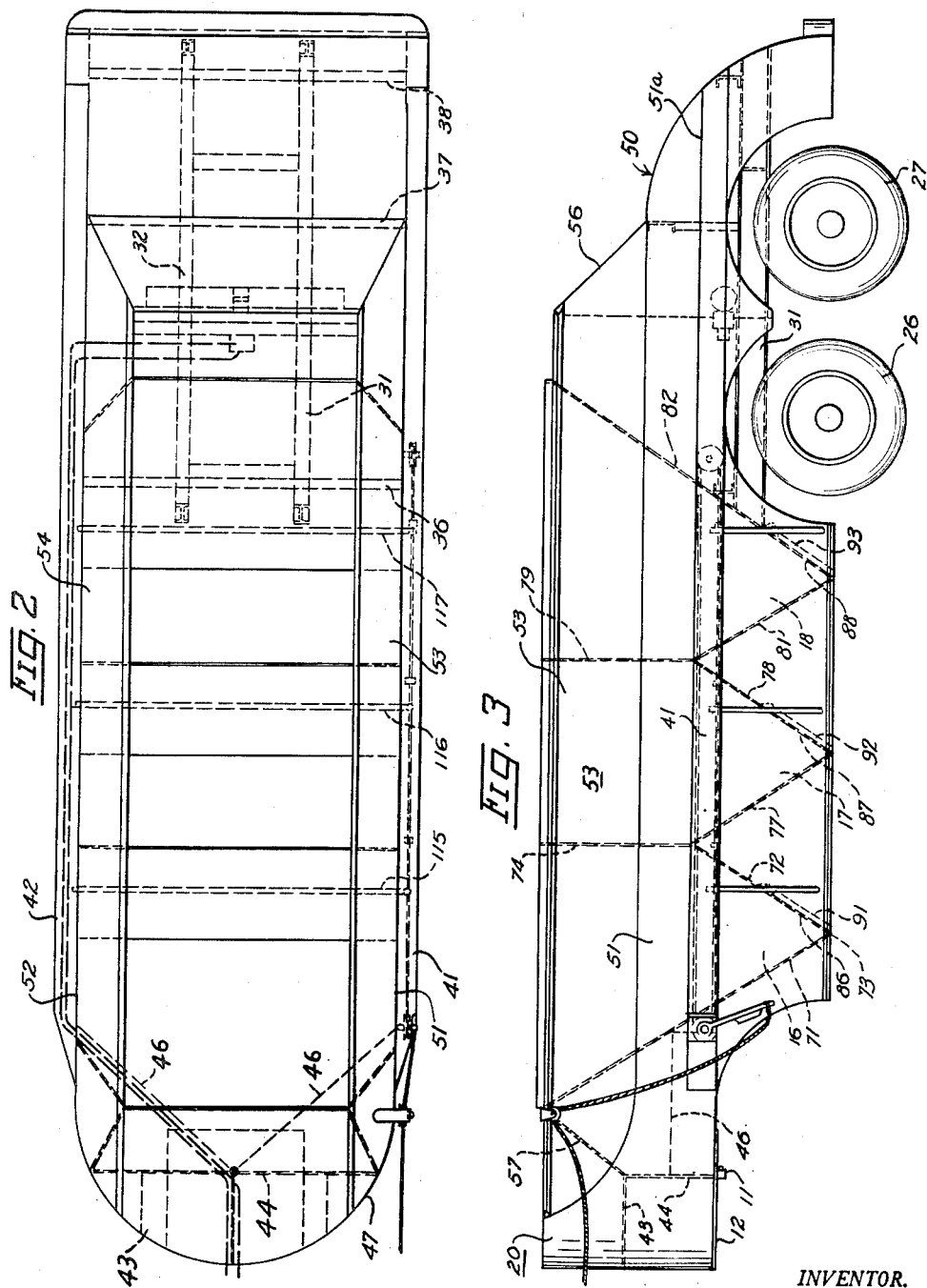
INVENTOR.
HERBERT H. TURNER
BY
Flournoy Corey
ATTORNEY.

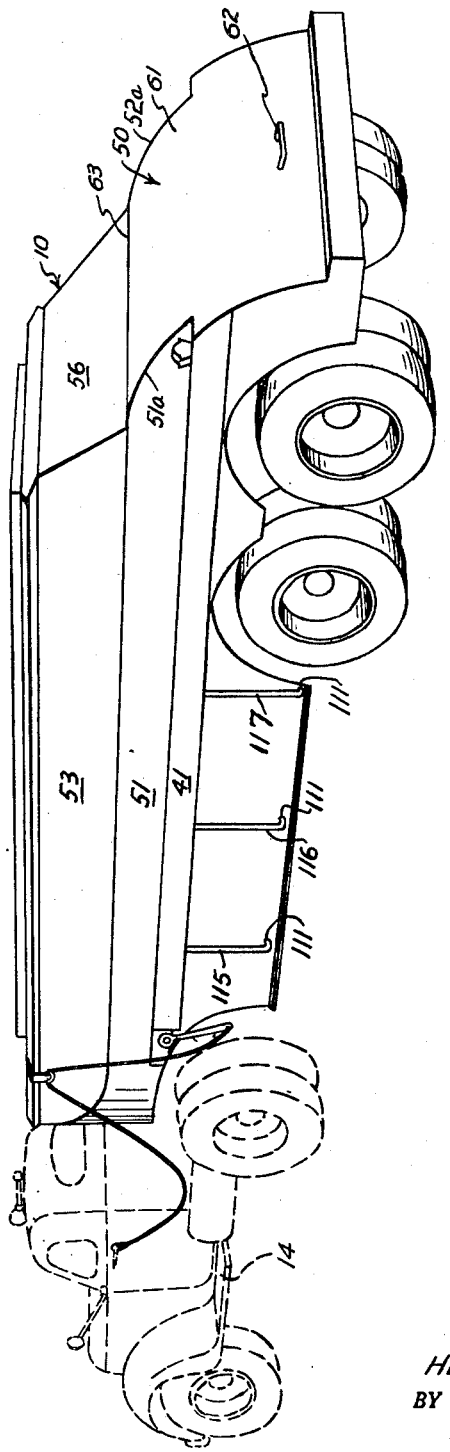

Sept. 28, 1954  H. H. TURNER  2,690,352
PLURAL HOPPER SUCCESSIVELY TRIPPED DUMP TRAILER
Filed April 7, 1949  6 Sheets-Sheet 3
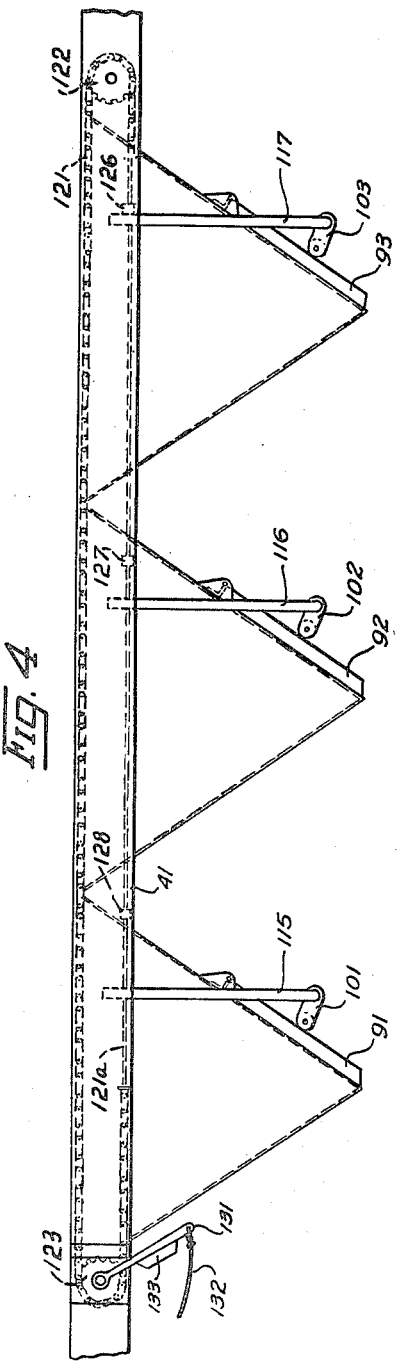
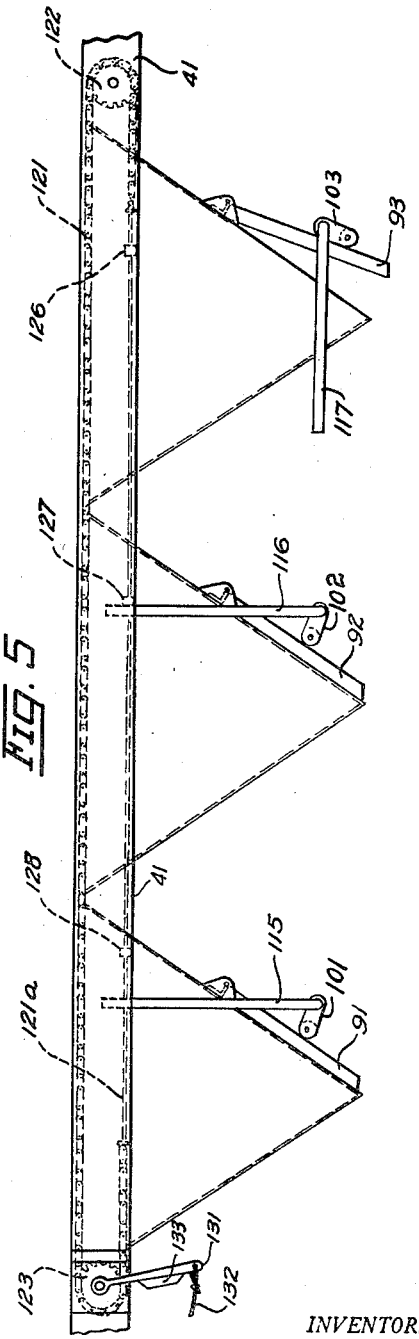
INVENTOR.
HERBERT H. TURNER
BY Flournoy Corey
ATTORNEY.

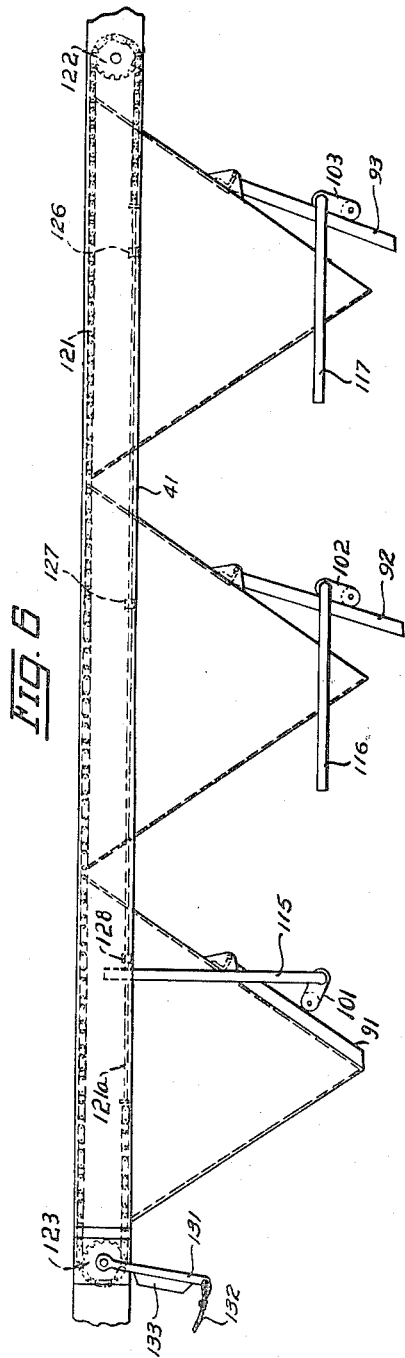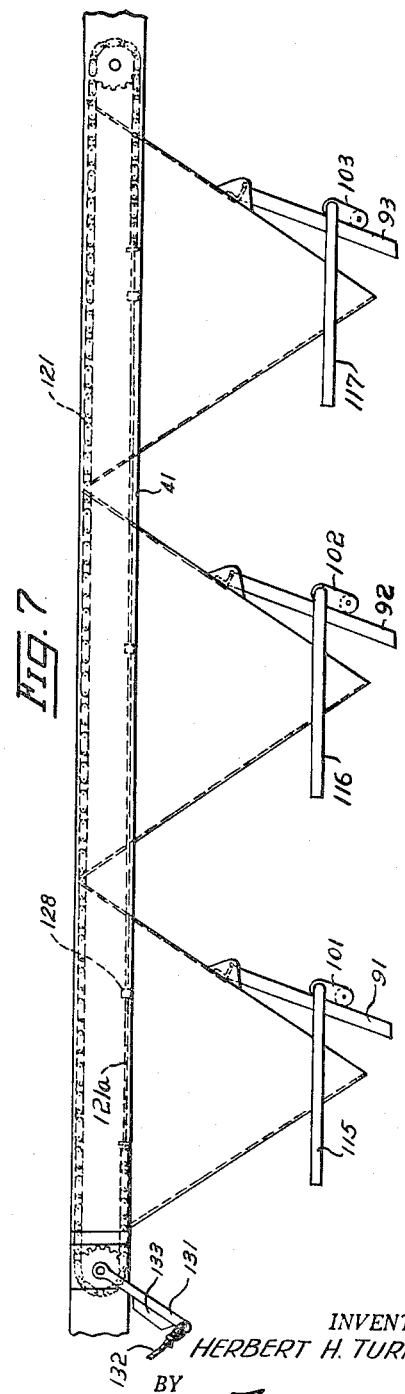

Sept. 28, 1954      H. H. TURNER      2,690,352
PLURAL HOPPER SUCCESSIVELY TRIPPED DUMP TRAILER
Filed April 7, 1949      6 Sheets-Sheet 5
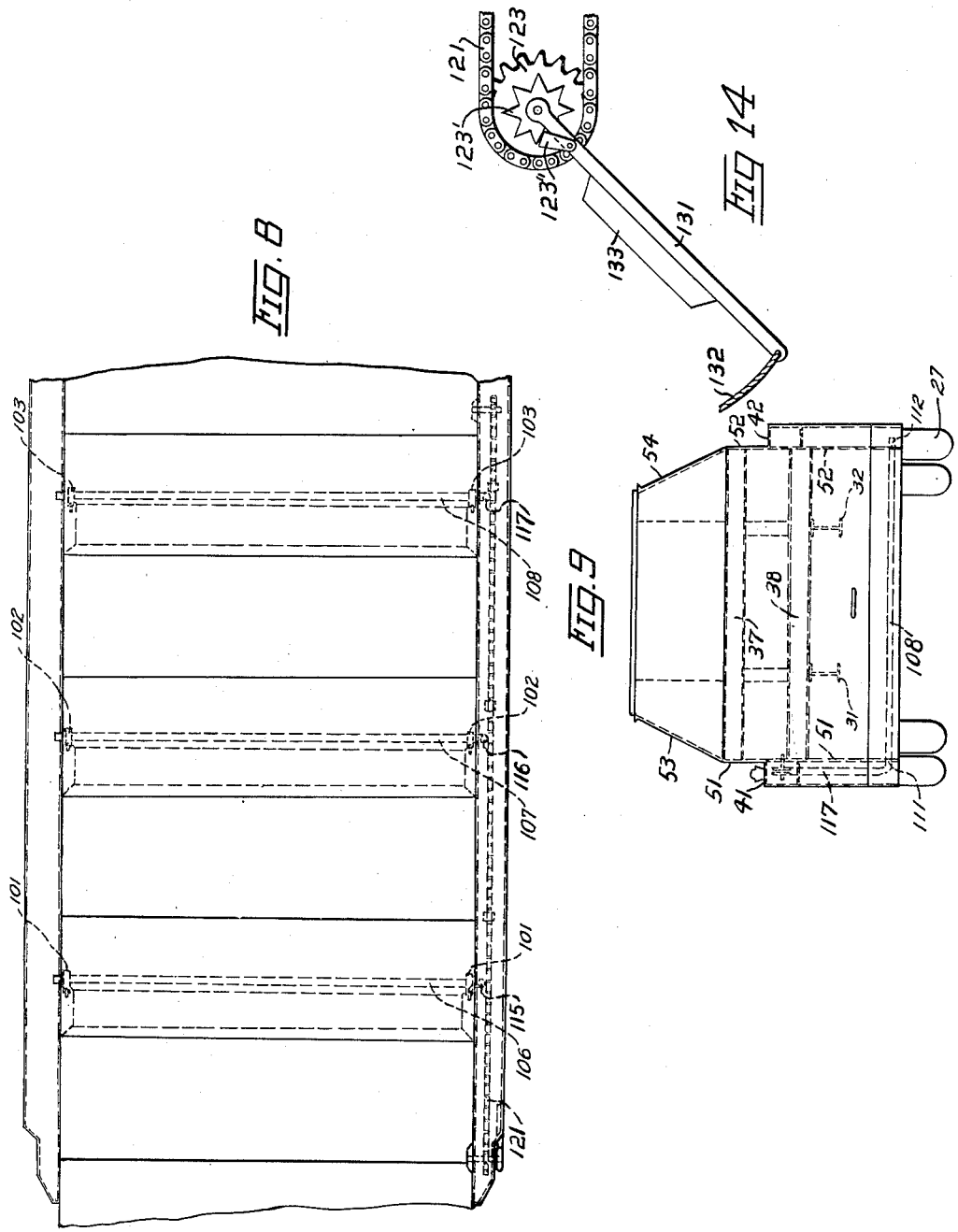
INVENTOR.
HERBERT H. TURNER
BY
*Flournoy Corey*
ATTORNEY Sept. 28, 1954  H. H. TURNER  2,690,352
PLURAL HOPPER SUCCESSIVELY TRIPPED DUMP TRAILER
Filed April 7, 1949  6 Sheets-Sheet 6
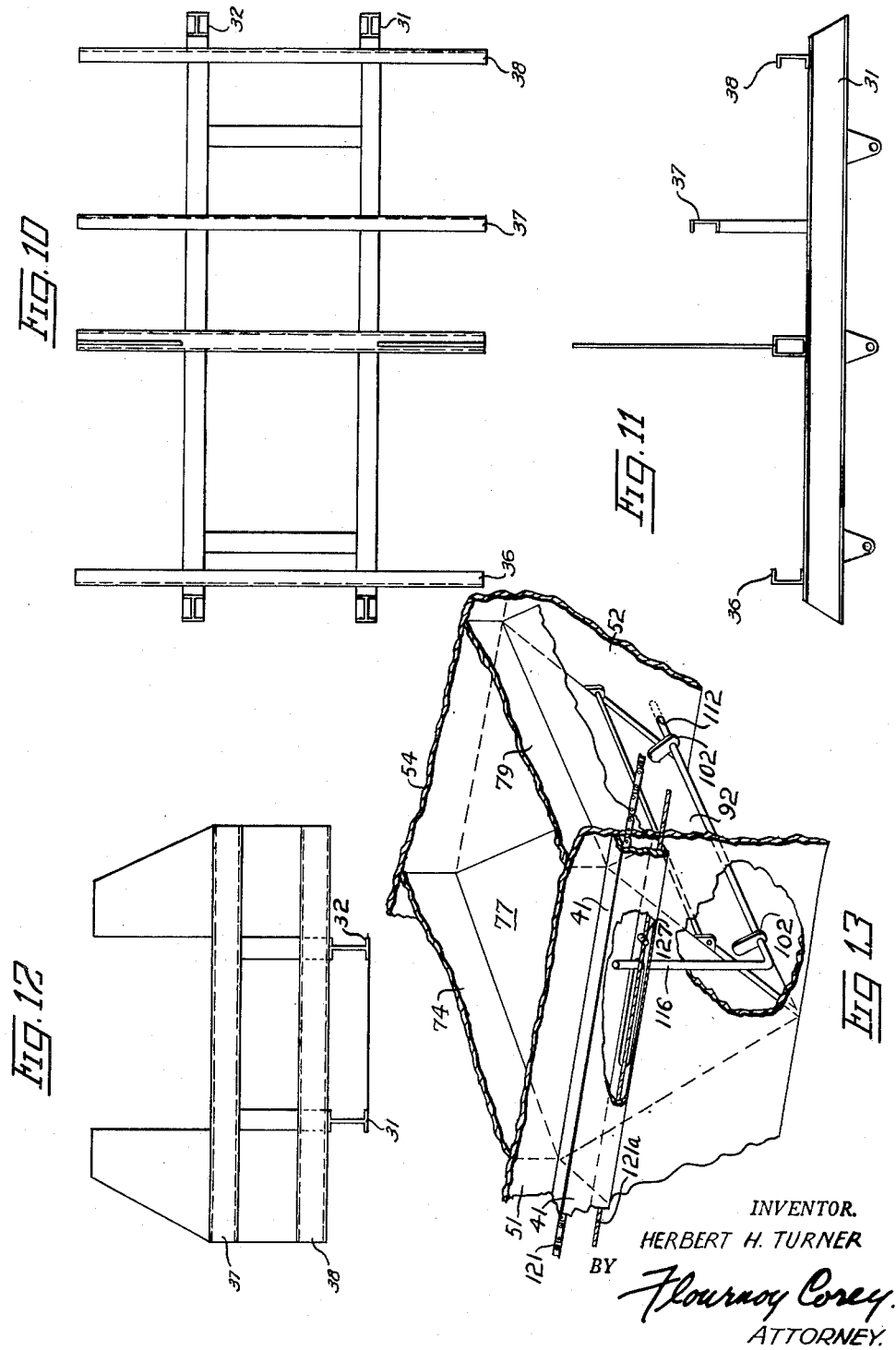
INVENTOR.
HERBERT H. TURNER
BY Flournoy Corey.
ATTORNEY.

Patented Sept. 28, 1954

2,690,352

UNITED STATES PATENT OFFICE 2,690,352

PLURAL HOPPER SUCCESSIVELY TRIPPED DUMP TRAILER

Herbert H. Turner, Boscobel, Wis.

Application April 7, 1949, Serial No. 86,010

4 Claims. (Cl. 298—8)

This invention relates to vehicles and has particular relation to a dump trailer for carrying gravel, aggregate and the like.

Vehicles for carrying gravel, aggregate, coal, sand, and the like, frequently are trucks with high rectangular box-like load carrying boxes mounted on truck frame members and usually adapted to be dumped by means of hydraulic jacks or the like, which raise the front ends of the boxes to dump the load.

As a result of competition, it has been necessary for contractors and others to transport greater and greater unit loads in order to meet the prices of their competitors and to enable them to transport the huge volumes of materials necessary in modern construction.

When such dump trucks are used, however, particularly in the larger sizes, several difficulties present themselves. The dump trucks or other aggregate transport devices employed by the contractors are so huge and so high and wide that they are likely to terrify the motorist on the highway or create in him a dislike for a seemingly dangerous highway vehicle. This unfortunate impression created by the great bulk and ungainliness of the transporting vehicle works adversely to the interests of the contractor or other user in the form of legislation and public sentiment tending to limit the size of the vehicles, even though their loading per wheel is within permissible legal limits.

Another disadvantage of the carriers of the prior art is that it is difficult to dump a partial load, not only because it is difficult to subdivide a load and dump it—one part here and another at another point, and still another at a third point—but also because the dumping of a part of a load results in an unbalanced condition in the vehicle, which may prevent the traction wheels from securing sufficient traction to properly move the vehicle.

Another object of my invention is to provide means for carrying and dumping a load of aggregate or other material in divided parts so that one part at a time may be dumped and only that part dumped which is desired by the operator.

Another object of my invention is to provide means for dumping the load from a vehicle or carrier in selected points so that traction may always be had at the wheels which are used to move the vehicle, so as to prevent undesirable unbalance in the vehicle.

Still another object of the invention is to provide means for varying the loading on the wheels of the tractor so that the loading on the wheels in proportion to the total load may be increased and varied at will.

Another object of my invention is to provide a new and novel aggregate carrying vehicle in which loading of the wheels of tractor and vehicle may be varied as desired and dumping of part loads accomplished as desired.

Other and further features and objects of the invention will be more apparent to those skilled in the art upon a consideration of the accompanying drawings and following specifications, wherein is disclosed a single exemplary embodiment of the invention, with the understanding however, that such changes may be made therein as fall within the scope of the appended claims, without departing from the spirit of the invention.

In said drawings:

Figure 1 is a rear, quartering, view in perspective of one embodiment of my invention.

Figure 2 is a top plan view of the trailer shown in Figure 1 and illustrating the structure of the trailer.

Figure 3 is a view in side elevation of the trailer shown in Figures 1 and 2.

Figure 4 is a schematic illustration of the hoppers and dumping means as they appear in the closed position.

Figure 5 is a view of the hoppers as they appear with the rearmost hopper opened to discharge a load.

Figure 6 is a view in schematic relation of the hoppers as they appear with the rearmost and the middle hoppers open for discharge.

Figure 7 is a view illustrating how the hoppers and closure devices appear when all three hoppers shown are opened.

Figure 8 is a fragmentary top elevational view illustrating more particularly the mechanism for opening and closing the hoppers.

Figure 9 is a view in rear elevation illustrating the supporting structure of the trailer and a portion of the hopper door operating structure.

Figure 10 is a plan view of the supporting framework by which the trailer is mounted on the twin tandem axles. In this view the cross section form of certain of the members has been illustrated.

Figure 11 is a view in side elevation of the structure shown in Figure 10.

Figure 12 is an end view of the structure shown in Figures 10 and 11.

Figure 13 is a view in perspective showing the door opening and closing mechanism, and Figure 14 is a view of the ratchet mechanism.

Referring, then, more particularly to Figure 1, a trailer constructed according to one embodiment of my invention and illustrated at 10, has the conventional fifth wheel king pin and plate arrangement, shown better in Figure 3 at 11 and 12, so that the trailer may be attached to the tractor 14.

Referring more particularly to Figures 2 and 3, the load carrying members of the trailer are the hoppers 16, 17 and 18. That portion of the trailer projecting forwardly of the hopper 16 and illustrated generally at 20, which may be termed the nose of the trailer, has for its main purpose the support of the trailer on the fifth wheel of the trailer 10 on the tractor 14, while that portion of the vehicle rearwardly of the hopper 18 serves mainly as a means for mounting the tandem dual wheels 26 and 27.

It is extremely desirable that the vehicle be long, with the center of gravity low for best roadability and most pleasing appearance. Therefore the hoppers themselves project downwardly to positions between the wheels of the tractor 14 and the dual tandem wheels of the trailer. In order, therefore, to support the trailer body on the rear wheels, I provide beams, illustrated at 31 and 32, on which the axles of the tandem wheels are mounted in accordance with the usual structure.

Cross beams 36 and 38, see Figures 3 and 9, are welded to longitudinally extending side beams 41 and 42, which are the main hopper carrying supports for the hoppers 16, 17 and 18. These beams 41 and 42 terminate at their forward ends in the nose structure generally indicated at 20. This nose 20 is made up of heavy plates welded together to form a load carrying structure. At the bottom of the nose is the fifth wheel 12 and king pin 11. Welded to the top rear surface of fifth wheel 12 are two converging vertically arranged support members 46—46 which are respectively welded at their rear end portions to the front portions of the longitudinal beams 41 and 42, while the plates 46—46 converge into an apex at the front. A transverse plate member 44 extends upward from the rear portion of the top surface of fifth wheel 12 and abuts at the juncture of the converging side plates 46—46. A horizontally disposed plate bottom 43 is positioned about midway the height of the nose and parallel to the fifth wheel 12. The fifth wheel 12 and horizontal plate 43 have curved front edges and a curved plate 47 is welded to the plates 12, 43, and 44' as well as in the longitudinal beams 41 and 42. The plates of the vertical sides of the trailer, illustrated at 51 and 52, and the sloping sides illustrated at 53 and 54, likewise carry their portion of the load.

It is to be noted that the upper portions of the sides of the trailer at 53 and 54 slope inwardly toward each other at the top, see Figures 1 and 9, and that the rear upper wall at 56 slopes forwardly at the top so that the actual opening of the trailer is made smaller than the greatest cross sectional area of the trailer.

It is to be noted too that the front wall at 57 slopes rearwardly at the top, also limiting the area of the opening at the top of the trailer. The side plates 51 and 52 turn downwardly, as illustrated at 51a and 52a, at the rear of the trailer so as to form a curved, rear deck illustrated generally at 59 in Figures 1 and 3. This rear portion is preferably covered by means of a curved door, illustrated at 61, which may be opened by means of the handle 62. This portion is hinged by hidden hinges at 63.

The side walls of the trailer of course form the sides of the hoppers 16, 17 and 18, and sloping plates form the forward and rearward walls of each hopper or division. The hopper 16 has a front wall formed by the sloping plate 71 and its rear wall is formed by a plate 72 extending from the lower transverse edge 73 of the hopper to a position at the upper level of the side beams 41 and 42. A dividing plate 74 extends upwardly from this point to divide off the hopper 16 from the hopper 17. In the same manner, sloping side walls 77 and 78 form the bottom walls of hopper 17, and another dividing plate 79 divides this hopper 17 from the rear hopper 18.

The bottom of the hopper 18 is formed by the forward sloping wall 81 and the rearwardly sloping wall 82. The rear sloping walls 72, 78 and 82 of the hopper 16, 17 and 18 are provided with rectangular openings at 86, 87 and 88 to permit the escape of material from the hoppers when doors 91, 92 and 93 are opened. These doors consist of rectangular plates hinged at their upper ends and swinging to an open position, as illustrated in Figures 5, 6 and 7.

The means for locking these doors are the over-center levers, illustrated more particularly in Figures 4 to 9 inclusive, and these members consist of toggle arms 101, 102 and 103 with the toggle arms duplicated on the other sides of a trailer, as illustrated in Figure 8. The toggle arms 101, 102 and 103 are welded or otherwise secured to cross shafts 106, 107 and 108, which cross shafts are pivotally mounted in suitable openings in the side frame members, as illustrated at 111 and 112 of Figure 9.

For the purpose of better illustration, a fragment of the side 41 of the trailer is illustrated in Figure 4. Operating handles 115, 116 and 117 are provided for rotating the cross shafts 106, 107 and 108 to thus rotate the toggle arms 101, 102 and 103. Thus, as illustrated in Figure 4, when the operating handles 115, 116 and 117 are in the vertical position, the toggles 101, 102 and 103 are in the over-center position to lock the doors 91, 92 and 93, but when the upper end of one of the levers, as 117 in Figure 5, is pulled forwardly, the free end of the toggle drops to a lower position to permit the door 93 to swing open by its own weight and by reason of the pressure of the material within the hopper.

Closing of the doors in the present embodiment of the invention is done manually by rotating the handles 115, 116 and 117 to the vertical position. Opening of the doors can, of course, be accomplished by pushing the handles selectively forward to the open position, as shown in Figures 5 to 7 inclusive, but it is extremely desirable that the hoppers be opened successively from rear to front so as to help maintain a tractive load on the drive wheels of the tractor so long as there is a load in the trailer, and I have therefore provided a mechanism for successively opening the hopper doors from rear to front. One form of this opening structure is the endless chain shown at 121. This chain runs over sprockets 122 at the rear of the beam 41 and another sprocket 123 is provided at the front end of the beam 41. These chains and sprockets are more or less concealed by the beam 41.

A portion of the endless belt 121 is the cable, illustrated at 121a, and this cable carries actuating projections 126, 127 and 128 which are clamped to the cable in any suitable manner.

These projections are arranged to strike successively the levers 117, 116 and 115—that is, if the endless belt or chain 121 is rotated with the bottom flight moving forward, the projection 126 will strike the lever 117 to move the upper end of the lever forward to release the door 93, as illustrated in Figure 5. On continued forward motion of the lower flight of the chain 121, as illustrated in Figure 6, the projection 127 strikes the upper end of the operating lever 116 to open the door 92.

Upon still further forward movement of the lower portion of the chain 121, the projection 128 strikes the upper end of the operating lever 115 and permits the door 91 to swing open, as illustrated in Figure 7.

Rotation of the chain 121 may be secured by means of the arm 131 which, in turn, may be swung forwardly by pulling on the rope 132. The weight 133 on the arm causes it to swing rearwardly again when the rope 132 is released, so that a ratchet 123' actuated by the arm and acting on the sprocket 123 will cause rotation of the sprocket to rotate the chain. Thus, a pull on the rope 132 will pull the arm 131 to the forward position shown in Figure 7 to pull the lower portion of the chain 121 forward. Releasing the rope lets the arm swing rearwardly to the position shown in Figure 4 under the influence of the weight 133, so that the forward movement of the lower portion of the chain 121 may be repeated until all doors are opened. When the levers 115, 116, and 117 are reset to their vertical position by hand to close the doors, the cable 121a of the endless belt 121 may be reset by merely pulling the cable 121a to the rear to reset the projections 126, 127, and 128.

In this manner the load of aggregate or other material in the trailer may be dumped at any desired successive point, and sufficient load for proper traction may be always maintained on the driving wheels of the tractor.

Although the total load is decreased, as the hoppers are emptied, it is to be noted that the center of gravity shifts successively forward as each hopper is emptied, so that for instance when approximately two-thirds of the load has been discharged, the weight of the remaining one-third is concentrated at a point well forward of the rear wheels of the trailer and closest to the traction wheels of the tractor, so that the load on the traction wheels of the tractor is maintained whether all of the hoppers are full, whether two are full, or whether only one is full. Obviously any number of hoppers may be employed just so the over-all length of the trailer is within legal limits.

The toggle arms 101, 102 and 103 limit the degree of opening of the doors 91, 92 and 93 so that the openings of the hoppers may be regulated to six or seven inches, for instance, for better spreading of gravel or the like on the roadway.

The appearance of the trailer is pleasing and it does not have the frightening aspects of the big, high boxes now commonly used.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a dump trailer, a plurality of hoppers arranged in tandem arrangement with the bottom walls of the hoppers extending downwardly in V arrangement, each rear bottom wall having a discharge opening therein, doors at the rear of each rear hopper bottom adapted to close each opening and to swing rearwardly to permit discharge through said openings, actuating mechanisms for each of the doors including a shaft rotatably mounted on said trailer and extending in spaced relation from and transversely behind the hopper doors and adapted for rotational movement, the shaft having over-center lever arms fixed thereto for pressing the doors into closed relation with said opening in each hopper rear bottom wall and holding them closed, and on rotation of the shafts, to cause the over-center levers to swing in parallel and abutting relation with the doors to permit limited opening of the doors, actuating means directly connected to each of said shafts for rotating each of the shafts, and means mounted on the trailer and operably associated with each of said actuating means for successively actuating each actuating means to open the doors in succession.

2. In a dump trailer, a plurality of hoppers arranged in tandem arrangement with the bottom walls of the hoppers extending downwardly in V arrangement, each rear bottom wall having a discharge therein, doors at the rear of each rear hopper bottom adapted to close each opening and to swing rearwardly to permit discharge through said openings, actuating mechanisms for each of the doors comprising a shaft rotatably mounted on said trailer and extending in spaced relation from and transversely behind the hopper doors and adapted for rotational movement, the shaft having over-center lever arms fixed thereto for pressing the doors into closed relation with said opening in each hopper rear bottom wall and holding them closed, and on rotation of the shaft, to cause the over-center levers to swing in parallel and abutting relation with the doors to permit limited opening of the doors, an actuating lever rigidly attached to each shaft for rotating the same, an endless belt mounted on the trailer and operably associated with each of said rigid levers, and projecting means on the endless belt for engaging each actuating lever in succession.

3. In a transport dump trailer, a hopper supporting frame and a plurality of hoppers supported in tandem arrangement therein, each hopper having a discharge opening therein in an inclined plane to provide a downwardly and rearwardly directed opening, a door for closing the opening including a plate pivotally engaged to the hopper above the upper edge of the opening whereby swinging movement against gravity closes the opening, and means for swinging the door closed and holding it against opening comprising a shaft extending in spaced relation to and across the outer face of the door and pivotally engaged to the hopper frame, cams on the shaft to bear against the door to close and hold it closed on rotation of the shaft, a rigid lever engaged on the shaft at a position such that when the cams are in holding position the lever extends vertically upward, and means for knocking the levers successively from their vertical position to permit the doors to open comprising a longitudinally movable member movable from one end of the transport trailer toward the other and having a plurality of spaced projecting members mounted thereon, the spacing between said projecting members being such that when one of said members engages one of said levers the remaining projecting members are out of engagement with the remaining levers.

4. In a transport dump trailer, a frame for supporting a plurality of hoppers and a plurality of hoppers supported in tandem thereby, each hopper having a discharge opening therein in an inclined plane to provide a downwardly and rearwardly directed opening and a door for closing each opening including a plate pivotally engaged to the hopper above the upper edge of the opening whereby swinging movement of said door against gravity closes the opening, and means for swinging each door closed including a shaft extending in spaced relation to and across the outer face of the door and pivotally engaged to the hopper, and cams on the shaft to bear against the door to close and hold it closed on rotation of the shaft, a rigid lever engaged to each shaft so that when the lever is in an upwardly extending position the cams hold the door closed, and an endless belt mounted on said frame in a longitudinal position adjacent the upper ends of said rigid levers and having spaced apart projections thereon arranged to successively engage said levers whereby said doors are successively opened.

References Cited in the file of this patent

UNITED STATES PATENTS

| Number | Name | Date |
| --- | --- | --- |
| 351,017 | Ames | Oct. 19, 1886 |
| 838,510 | Otis | Dec. 11, 1906 |
| 1,076,446 | Pape | Oct. 21, 1913 |
| 1,122,273 | Hansen | Dec. 29, 1914 |
| 1,268,390 | Sanford | June 4, 1918 |
| 1,329,101 | Young | Jan. 27, 1920 |
| 1,417,709 | Yelm | May 30, 1922 |
| 1,789,184 | Wasberg | Mar. 31, 1931 |
| 1,972,831 | Sanford | Sept. 4, 1934 |
| 2,060,130 | Scott | Nov. 10, 1936 |
| 2,080,943 | Jones | May 18, 1937 |

FOREIGN PATENTS

| Number | Country | Date |
| --- | --- | --- |
| 454,084 | France | of 1913 |
| 272,073 | Italy | of 1928 |